(12) United States Patent
Su et al.

(10) Patent No.: US 10,012,760 B2
(45) Date of Patent: Jul. 3, 2018

(54) HEAT SOURCE-FREE FIBER POSITIONING AND ORIENTING SYSTEM FOR SEEPAGE OF SUBMERGED OR PARTIALLY-SUBMERGED STRUCTURES AND MONITORING METHOD THEREOF

(71) Applicant: Hohai University, Nanjing, Jiangsu (CN)

(72) Inventors: Huaizhi Su, Jiangsu (CN); Meng Yang, Jiangsu (CN); Hao Li, Jiangsu (CN); Xing Li, Jiangsu (CN); Zhaoqing Fu, Jiangsu (CN)

(73) Assignee: HOHAI UNIVERSITY, Nanjing, Jiangsu (CN)

( * ) Notice: Subject to any disclaimer, the term of this patent is extended or adjusted under 35 U.S.C. 154(b) by 496 days.

(21) Appl. No.: 14/890,501

(22) PCT Filed: Dec. 30, 2014

(86) PCT No.: PCT/CN2014/095610
§ 371 (c)(1),
(2) Date: Nov. 11, 2015

(87) PCT Pub. No.: WO2016/106572
PCT Pub. Date: Jul. 7, 2016

(65) Prior Publication Data
US 2016/0356918 A1    Dec. 8, 2016

(30) Foreign Application Priority Data

Dec. 29, 2014 (CN) .......................... 2014 1 0833964

(51) Int. Cl.
*G01V 8/10* (2006.01)
*G01F 1/708* (2006.01)
(Continued)

(52) U.S. Cl.
CPC .............. *G01V 8/10* (2013.01); *G01F 1/7086* (2013.01); *G01V 8/02* (2013.01); *G01D 5/353* (2013.01); *G01D 11/30* (2013.01)

(58) Field of Classification Search
CPC .......... G01V 8/10; G01V 8/02; G01F 1/7086; G01D 5/353; G01D 11/30
See application file for complete search history.

(56) References Cited

U.S. PATENT DOCUMENTS

| 6,993,437 B1 | 1/2006 | Chadwick et al. |
| 2004/0043501 A1* | 3/2004 | Means .................... E21B 23/03 436/164 |

FOREIGN PATENT DOCUMENTS

| CN | 103364320 | 10/2013 |
| CN | 103364321 | 10/2013 |

(Continued)

OTHER PUBLICATIONS

International Search Report filed in PCT/CN2014/095610.

*Primary Examiner* — Georgia Y Epps
*Assistant Examiner* — Don Williams
(74) *Attorney, Agent, or Firm* — Rankin, Hill & Clark LLP (57) ABSTRACT

A heat source-free fiber positioning and orienting system for seepage of submerged or partially submerged structures and monitoring method thereof includes a plurality of seepage monitoring devices connected through rotary supports. The seepage monitoring devices include first seepage monitoring units symmetrically distributed on the front and back and second seepage monitoring units symmetrically distributed on left and right. Seepage monitoring fibers are distributed in the first seepage monitoring units and the second seepage monitoring units, and the seepage conditions of the submerged or partially submerged structures are monitored through the seepage monitoring fibers. The heat source-free (Continued)

fiber positioning and orienting system for the seepage of submerged or partially submerged structures has the characteristics of no heating, distribution manner, multiple orientations and synchronicity or the like.

9 Claims, 5 Drawing Sheets

(51) Int. Cl.
    *G01V 8/02*     (2006.01)
    *G01D 5/353*    (2006.01)
    *G01D 11/30*    (2006.01)

(56) References Cited

FOREIGN PATENT DOCUMENTS

| | | |
|---|---|---|
| DE | 202004013034 | 2/2006 |
| WO | 2009114722 | 9/2009 |

\* cited by examiner

HEAT SOURCE-FREE FIBER POSITIONING AND ORIENTING SYSTEM FOR SEEPAGE OF SUBMERGED OR PARTIALLY-SUBMERGED STRUCTURES AND MONITORING METHOD THEREOF

TECHNICAL FIELD

The present invention relates to positioning and orientating hidden dangers of submerged or partially-submerged structures, and more particularly, to a heat source-free fiber positioning and orienting system for seepage of submerged or partially-submerged structures and monitoring method thereof.

BACKGROUND

Seepage is an important factor and serious disaster that affects the safe and long term services of submerged or partially submerged structures in irrigation works, maritime works, underground constructions and the like. Particularly, widespread damage and wreckage of earth and rockfill structures like earth and rockfill dams and embankments are caused by different levels of leakage and various problems derived by leakage. According to statistics, more than 90% of embankment breaching and more than one third of damages in earth and rockfill dam engineering in China are caused by seepage. Researching and developing advanced seepage positioning and orientating instruments, devices and distinguishing methods to reliably detect the position, range, direction and area of the seepage occurred in the submerged or partially submerged structures and take effective seepage prevention and resistance measures in time has extremely important significances for ensuring the engineering safety.

At present, submerged or partially submerged structures seepage positioning and orientating monitoring is mostly rested upon a point-type seepage sensor. However, missed monitoring often occurs since the monitoring points are limited. Moreover, most of the conventional seepage sensors have the defects of big volume, more leads, poor compatibility and the like. With the development of distribution type fiber sensing and monitoring technologies, works from engineering & science and technology industry pay increasing attention and involvement on researching and developing distribution type fiber identifying devices and methods that can be applied to seepage position and direction monitoring of submerged or partially submerged structures. However, most of the existing distribution type fiber seepage monitoring technologies at home and abroad are rested on a peripheral heat source to heat the fibers to be monitored; however, the safety of operating personnel will be threatened and the monitoring results will be affected if such situations as broken external package layer or electric leakage occurs. Moreover, it is difficult to guarantee a peripheral current heating system in the service environment of the submerged or partially submerged structures, which greatly hinders the application and popularization of the technology in actual engineering.

SUMMARY

Object of the invention: in order to overcome the defects of the prior art, the present invention provides a heat source-free fiber positioning and orienting system for seepage of submerged or partially submerged structures, which has the characteristics of no heating, distribution manner, multiple orientations and synchronicity or the like, and has prominent advantages on such aspects like reducing the monitoring cost, improving the monitoring precision and engineering practicability or the like.

Technical solution: in order to solve the foregoing technical problem, the heat source-free fiber positioning and orienting system for seepage of submerged or partially submerged structures according to the present invention includes a plurality of seepage monitoring devices connected through rotary supports, wherein the seepage monitoring devices first seepage monitoring include units symmetrically distributed on the front and back and second seepage monitoring units symmetrically distributed on left and right;

the first seepage monitoring unit includes a first fiber-carrying recess for fixing a monitoring fiber unit, the outside of the first fiber-carrying is provided with a fiber-carrying protection layer, the two ends of the first fiber-carrying recess are respectively provided with a left fiber-carrying end and a right fiber-carrying end, the left fiber-carrying end is connected to a left connecting ball through a left connecting handle, the right fiber-carrying end is connected to a right connecting ball through a right connecting handle, the left connecting ball and the right connecting ball are hinged at the two ends of a cross beam support, and the cross beam support is extended with a left pin shaft and a right pin shaft towards the left and right sides;

the second seepage monitoring unit includes a second fiber-carrying recess for fixing the monitoring fiber unit, the two ends of the second fiber-carrying recess are respectively provided with an upper fiber-carrying arc end and a lower fiber-carrying arc end, the upper fiber-carrying arc end is connected to an upper connecting shaft ball through an upper arc connecting handle, the lower fiber-carrying arc end is connected to a lower connecting shaft ball through a lower arc connecting handle, the upper connecting shaft ball and the lower connecting shaft ball are hinged at the two ends of a gable end beam, the gable end beam is extended with a gable convex column, and the inside of the gable convex column is provided with conical holes matched with the left pin shaft and the right pin shaft; and the rotary support includes a first supporting framework column and a second supporting framework column, one end of the first supporting framework column is connected to the cross beam support and the other end is connected to a bottom circular turntable, and an upper circular turntable is installed on the bottom circular turntable; one end of the second supporting framework column is connected to the cross beam support of another seepage monitoring device and the other end is inserted into the upper circular turntable; penetrating vertical beam are installed on the centers of the bottom circular turntable and the upper circular turntable, the first supporting framework column and the second supporting framework can respectively rotate around the penetrating vertical beam, and the upper and lower ends of the penetrating vertical beam are provided with turntable circular grooves to block the penetrating vertical beam.

Preferably, the cross beam support includes an upper horizontal cross beam and a lower horizontal cross beam connected to the upper horizontal cross beam, the two ends of the upper horizontal cross beam and the lower horizontal cross beam are respectively extended with a left framework beam and a right framework beam, the left framework beams and the right framework beams of the upper horizontal cross beam and the lower horizontal cross beam are respectively hinged with the left connecting ball and the right connecting ball, the middle parts of the upper horizontal cross beam and the lower horizontal cross beam are respectively provided with an upper end groove and a lower end groove, the upper end groove is connected to the first supporting framework column, and the lower end groove is connected to the first supporting framework column of another rotary support.

Preferably, the upper horizontal cross beam is provided with a T-shaped cross beam clamping groove, and the lower horizontal cross beam is provided with a cross beam lug boss moving along the T-shaped cross beam clamping groove.

Preferably, the monitoring fiber unit includes one piece of seepage monitoring fiber and two pieces of calibrated fibers, the two pieces of calibrated fibers are located at the two sides of the seepage monitoring fiber, the outside of the seepage monitoring fiber is sheathed with a hard steel ring, the calibrated fibers are sheathed with an adiabatic interlayer and a hard protection layer from inside to outside in sequence, the outside of the seepage monitoring fiber is provided with an upper concave edge inner layer, a left concave edge inner layer, a lower concave edge inner layer and a right concave edge inner layer which are connected in sequence, the outside of the upper concave edge inner layer is provided with an upper concave edge middle layer and an upper concave edge outer layer in sequence, the outside of the left concave edge inner layer is provided with a left concave edge middle layer and a left concave edge outer layer in sequence, the outside of the lower concave edge inner layer is provided with a lower concave edge middle layer and a lower concave edge outer layer in sequence, and the outside of the right concave edge inner layer is provided with a right concave edge middle layer and a right concave edge outer layer in sequence. The bottom end of the concave structure will collect probable seepage water body in perimeter regions very easily, amplify the effect of small seepages, and be matched with the dialysis bar at the bottom end, thus greatly improving the identifying capacity on weak seepage or primary seepage. The arc section structure will enlarge the staying time and contact area of the seepage water body in the seepage region on the seepage monitoring fiber to the maximum, and have higher precision assurance effect on positioning the seepage position in the region for monitoring. Moreover, the upper concave edge outer layer has anti-seepage and anti-corrosion performances, and the upper concave edge middle layer and the upper concave edge inner layer having similar section shapes are designed to be closely connected to the upper concave edge outer layer. The three-layer concave design structure improves the intensity and toughness of the fiber specially used for seepage monitoring, and can play the roles of protecting internal structures and prolonging the service life and the like. Wherein, the hard protection layer is disposed outside the adiabatic interlayer, the inside of the adiabatic interlayer is contacted with the calibrated fiber; when the seepage water body acts on the region for monitoring, the calibrated fiber under the effect of the adiabatic interlayer is under a state that has no heat contact with the outside, and will be used as reference calibrated fiber, and second correction of the result of the reference calibrated fiber may be conducted by another calibrated fiber which is disposed symmetrically, so that the objective accuracy of the reference standard can be ensured to the maximum. The left concave edge outer layer and the right concave edge outer layer are convex edge structures with opposite concave edge outer layers. This opposite corresponding design greatly increases the sectional area of the special fibers for seepage, and improves the contact and connection tightness of the monitoring device and the structure for monitoring, and enhances the cooperativity between the monitoring device and the structure for monitoring. Moreover, one of the effects for disposing it into a structure respectively having three layers in left and right is to increase the thickness of the interlayer at the position of the calibrated fiber, and the strength and the toughness of the materials are constantly increased from inside to outside; therefore, not only the flexible transition connection between the interior of the interlayer and the calibrated fiber is improved, but also the effect of resisting a larger external seepage water pressure is increased; the left concave edge outer layer and the right concave edge outer layer have erosion resistance performance, so that the long-term coexistence between the left concave edge outer layer and the right concave edge outer layer, and the seepage water body is improved; in a complicated environment that may be possibly doped by corrosive ions, it has better seepage monitoring efficacy.

Preferably, the two sides of the seepage monitoring fiber are respectively connected to an upper dialysis bar and a lower dialysis bar, the upper dialysis bar traverses the hard steel ring, the upper concave edge inner layer, the upper concave edge middle layer and the upper concave edge outer layer in sequence so as to be contacted with an outside seepage water flow, and the lower dialysis bar traverses the hard steel ring, the lower concave edge inner layer, the lower concave edge middle layer and the lower concave edge outer layer in sequence so as to be contacted with the outside seepage water flow.

Preferably, an excircle retaining wall is installed outside the monitoring fiber unit, the excircle retaining wall comprises an upper-left excircle retaining wall, a lower-left excircle retaining wall, an upper-right excircle retaining wall and a lower-right excircle retaining wall, the upper-left excircle retaining wall, the lower-left excircle retaining wall, the upper-right excircle retaining wall and the lower-right excircle retaining wall form a concave-convex type fiber-carrying cavity, the monitoring fiber unit is located in the concave-convex type fiber-carrying cavity, the upper-left excircle retaining wall and the upper-right excircle retaining wall are tightly locked through an upper fiber-carrying buckle, the lower-left excircle retaining wall and the lower-right excircle retaining wall are tightly locked through a lower fiber-carrying buckle, the upper-left excircle retaining wall and the lower-left excircle retaining wall respectively rotate around a left circular swivel, and the upper-right excircle retaining wall and the lower-right excircle retaining wall respectively rotate around a right circular swivel. The approximate circular cross section of the excircle retaining wall makes secondary supplement on the concave section of the concave-convex designed monitoring fiber unit, and composes the fiber special for seepage disposed inside into a structure the outer section of which is approximate to a circle, thus making up the possible defects existing in production, transportation and disposing brought by its unique structure. The excircle retaining wall can be opened around the left circular swivel and the right circular swivel. The concave-convex type fiber-carrying cavity in the excircle retaining wall can precisely embed the fiber special for seepage of the present invention into the concave-convex type fiber-carrying cavity. The upper fiber-carrying buckle and the lower fiber-carrying buckle on the top and bottom of the excircle retaining wall firmly close the excircle retaining wall, and prevent the excircle retaining wall from loosing or disturbance of other factors such as artificial disturbance from the outside. Moreover, a cavity is designed between the excircle retaining wall and the concave-convex type fiber-carrying cavity, which reserves space for probable use and operation.

In the present invention, the first supporting framework column is connected to the upper end groove in the upper horizontal cross beam or the lower end groove in the lower horizontal cross beam, and the other end of the first supporting framework column is connected to the bottom circular turntable; after a lower rotating screw end is connected to the bottom turntable screw groove, the seepage monitoring device at one end can conduct 360-degree dead space-free free rotation with the seepage monitoring device at the other end around the penetrating vertical beam; one end of an upper rotating screw end is connected to the supporting framework column at the corresponding side thereof, the other end of the upper rotating screw end is connected to the upper turntable screw groove, and the upper rotating screw end can drive the seepage monitoring device connected through a connecting screw end at the corresponding side to conduct 360-degree dead space-free free rotation at the other side around the penetrating vertical beam; the upper circular turntable and the bottom circular turntable which are dislocated up and down can realize the noninterference running of adjacent devices, and conduct any angle and any slope disposing of different regions for monitoring; and the disposing structure of the upper and lower turntable circular grooves firmly mounts the upper circular turntable and the bottom circular turntable at the position of the penetrating vertical beam.

Preferably, a seepage wire screen is installed on the inner surface of the second fiber-carrying recess, and the surface of the seepage wire screen is alveolar.

Preferably, both the left pin shaft and the right pin shaft are provided with a circular arc recess, the upper surface of the gable convex column is provided with a pin hole, a pin is inserted into the pin hole, and the left pin shaft and the right pin shaft are fixed by inserting the pin into the circular arc recess.

A monitoring method for seepage of submerged or partially submerged structures by heat source-free fiber positioning and orienting system includes the following steps of:

first step: preparing a plurality of pieces of basic single mode bare fibers, and manufacturing the bare fibers into a plurality of pieces of monitoring fiber units with fixed length based on the structures of a first seepage monitoring unit and a second seepage monitoring unit;

second step: opening an upper-left excircle retaining wall, a lower-left excircle retaining wall, an upper-right excircle retaining wall and a lower-right excircle retaining wall around a left circular swivel and a right circular swivel, disposing the monitoring fiber units in a concave-convex type fiber-carrying cavity, then rotating the left circular swivel and the right circular swivel to fold the upper-left excircle retaining wall, the lower-left excircle retaining wall, the upper-right excircle retaining wall and the lower-right excircle retaining wall, using an upper fiber-carrying buckle and a lower fiber-carrying buckle to buckle the upper-left excircle retaining wall, the lower-left excircle retaining wall, the upper-right excircle retaining wall and the lower-right excircle retaining wall distributed at the two ends, then winding the monitoring fiber units on a monitoring fiber unit roller wheel, and transporting the monitoring fiber units to a position for seepage monitoring;

third step: adjusting a cross beam clamping groove on an upper horizontal cross beam, straightly sliding a cross beam convex groove in a lower horizontal cross beam along the cross beam clamping groove, and finally screwing and disposing the upper horizontal cross beam and the lower horizontal cross beam together in parallel, then unscrewing left pin shafts symmetrically distributed upper and lower in the left side, inserting the left pin shafts into conical holes in a gable convex column at the left side, then inserting pins into pin holes to fix the left pin shafts, and similarly, unscrewing right pin shafts symmetrically distributed upper and lower in the right side, inserting the right pin shafts into conical holes in a gable convex column at the right side, then inserting pins into pin holes to fix the right pin shafts;

fourth step: after transporting the monitoring fiber units to a region for monitoring, unscrewing the upper fiber-carrying buckle and the lower fiber-carrying buckle, opening the upper-left excircle retaining wall, the lower-left excircle retaining wall, the upper-right excircle retaining wall and the lower-right excircle retaining wall to take the monitoring fiber units out from the concave-convex type fiber-carrying cavity, disposing one monitoring fiber unit with fixed length in a second fiber-carrying recess the two ends of which are symmetrically distributed and the inner wall of which is provided with a seepage wire screen, and disposing another monitoring fiber unit with fixed length into a first fiber-carrying recess the inner wall of which is provided with a seepage wire screen; hinging the second fiber-carrying recess provided with a lower arc connecting handle, a lower fiber-carrying arc end, an upper arc connecting handle and an upper fiber-carrying arc end to the two ends of a gable end beam through a lower connecting shaft ball and an upper connecting shaft ball in the left side, and similarly, hinging the second fiber-carrying recess provided with the lower arc connecting handle, the lower fiber-carrying arc end, the upper arc connecting handle and the upper fiber-carrying arc end to the two ends of the gable end beam through a lower connecting shaft ball and an upper connecting shaft ball in the right side;

fifth step: hinging a first fiber-carrying recess connected with a left fiber-carrying end, a left connecting handle as well as a right fiber-carrying end and a right connecting handle to a left framework beam and a right framework beam through a left connecting ball and a right connecting ball at the upper end, and similarly, hinging the first fiber-carrying recess connected with the left fiber-carrying end, the left connecting handle, the right fiber-carrying end and the right connecting handle to the left framework beam and the right framework beam through a left connecting ball and a right connecting ball at the lower end, thus finishing disposing the seepage monitoring devices at the starting end hereto;

sixth step: inserting one end of a first supporting framework column into an upper end groove in the upper horizontal cross beam, disposing the other end of the first supporting framework column into a bottom turntable screw groove, inserting one end of the second supporting framework column into an upper turntable screw groove, pressing a penetrating vertical beam and disposing turntable circular grooves at the upper and lower ends of the penetrating vertical beam so as to completely block the penetrating vertical beam, connecting the other end of the second supporting framework column to a cross beam clamping groove in an upper horizontal cross beam of another seepage monitoring device, rotating the first supporting framework column and the second supporting framework column up and down around the penetrating vertical beam so as to adjust the disposing formats of the first and second supporting framework columns, thus being effectively matched with a structure for monitoring in a region for seepage monitoring, disposing lower horizontal cross beams of two seepage monitoring devices according to the same step above so as to connect different seepage monitoring devices in series through another new rotary support, adjusting the rotating direction of the supporting framework column so as to finish disposing the seepage monitoring devices at the tail end, and connecting the calibrated fibers and the seepage monitoring fibers in all the seepage monitoring devices with an information collecting device;

seventh step: opening the information collecting device, collecting the information of the calibrated fibers firstly, removing the fibers therein having a larger difference to the mean value, and reserving several pieces of calibrated fibers with minimum temperature changes, and taking the calibrated fibers subjected to mutual correction as the final calibrated fibers; and eighth step: after a seepage water body passes through the region, directly transferring the heat of the seepage water body to the position of the seepage monitoring fibers through an upper dialysis bar and a lower dialysis bar, recording the change situations of the seepage monitoring fibers in real time, comparing the seepage monitoring fibers with the calibrated fibers in the seventh step for analysis, and identifying the seepage condition of the position; when the seepage water body of the submerged or partially submerged structures flows through the seepage monitoring device, collecting the water body passed by through the first fiber-carrying recess and the second fiber-carrying recess in a first monitoring fiber unit and a second monitoring fiber unit, recording data collected by the information collecting device in real time, differentiating the value of the data value with the value of the calibrated fibers, drawing a differentiating result into a time travel curve, and determining that the seepage water body presents in the position if the time travel curve changes largely, thus realizing positioning; through the same method above, analyzing the time travel curves of the monitoring fiber unit disposed on different directions in the seepage monitoring devices, and determining that the seepage water body presents in a certain direction if the time travel curve of the monitoring fibers on the direction fluctuates largely, thus realizing positioning, and thereby realizing seepage positioning and orientating monitoring of the submerged or partially-submerged structures.

The heat source-free fiber positioning and orienting system for the seepage of submerged or partially submerged structures according to the present invention includes four monitoring fiber units on horizontal and vertical directions for monitoring, wherein the inside of each monitoring fiber unit is provided with a piece of seepage monitoring fiber and two pieces of calibrated fibers, which are disposed around the periphery and can monitor seepage conditions from different directions at maximum, greatly avoid missed monitoring of seepage on some directions, and have significant meanings on the multidimensional and multidirectional accurate seepage positioning and orientating of the submerged or partially-submerged structures; moreover, the four-direction monitoring fiber units can be disposed solely in a region which only needs to dispose seepage monitoring on a certain direction.

In the present invention, the fiber information collecting device refers to such common devices as an optical power meter, an OTDR (Optical Time Domain Reflectometer), a PPP-BOTDA (Pulse Prepump Brilliouin Optical Time Domain Analyzer) and the like.

Advantageous effects: according to the heat source-free fiber positioning and orienting system for seepage of submerged or partially submerged structures and the monitoring method of the present invention, the monitoring fiber units can monitor without resting on the heating of the peripheral heat source; and the series researched and developed excircle retaining walls of the seepage monitoring fiber units which are dislocated up and down, greatly improves the transportation and disposing capacity in actual engineering; the four-direction structural design of the seepage monitoring devices realizes all-direction seepage monitoring, 360-degree free rotation design, and can be disposed on any position for monitoring without dead angle, thus effectively making up partial defects of the conventional monitoring technologies and the present distribution type fiber monitoring technologies; the present invention has the characteristics of no heating, distribution manner, multiple orientations and synchronicity or the like, and has prominent advantages on such aspects like reducing the monitoring cost, improving the monitoring precision and engineering practicability or the like.

Wherein: 100-left concave edge outer layer; 101-left concave edge middle layer; 102-left concave edge inner layer; 103-right concave edge outer layer; 104-right concave edge middle layer; 105-right concave edge inner layer; 106-adiabatic interlayer; 107-hard protection layer; 108-calibrated fiber; 109-upper concave edge middle layer; 110-upper concave edge outer layer; 111-upper concave edge inner layer; 112-lower concave edge middle layer; 113-lower concave edge inner layer; 114-lower concave edge outer layer; 115-upper dialysis bar; 116-lower dialysis bar; 117-hard steel ring; 118-seepage monitoring fiber; 200-upper fiber-carrying buckle; 201-left circular swivel; 202-right circular swivel; 203-excircle retaining wall; 204-concave-convex type fiber-carrying cavity; 205-lower fiber-carrying buckle; 301-first supporting framework column; 302-lower rotating screw end; 303-upper rotating screw end; 304-second supporting framework column; 400-bottom turntable screw groove; 401-penetrating vertical beam; 402-bottom circular turntable; 403-upper circular turntable; 404-turntable circular groove; 405-upper turntable screw groove; 500-lower cross breaking beam; 501-lower connecting shaft ball; 502-lower arc connecting handle; 503-lower fiber-carrying arc end; 504-second fiber-carrying recess; 505-upper fiber-carrying arc end; 506-upper arc connecting handle; 507-upper connecting shaft ball; 508-upper cross breaking beam; 509-gable end beam; 510-conical hole; 511-gable convex column; 600-left fiber-carrying end; 601-left connecting handle; 602-left connecting ball; 603-right fiber-carrying end; 604-right connecting handle; 605-right connecting ball; 606-left framework beam; 607-left pin shaft; 608-right framework beam; 609-right pin shaft; 610-fiber-carrying protection layer; 611-first fiber-carrying recess; 612-upper horizontal cross beam; 613-upper end groove; 614-cross beam clamping groove; 615-lower horizontal cross beam; 616-lower end groove; 617-cross beam convex groove; and 618-seepage wire screen.

DETAILED DESCRIPTION

The present invention will be further described in details hereinafter with reference to the drawings.

As shown in FIG. 1 to FIG. 9, a heat source-free fiber positioning and orienting system for seepage of submerged or partially submerged structures of the present invention includes a plurality of seepage monitoring devices connected through rotary supports, wherein the seepage monitoring devices include first seepage monitoring units symmetrically distributed on the front and back and second seepage monitoring units symmetrically distributed on left and right.

Figure 1:
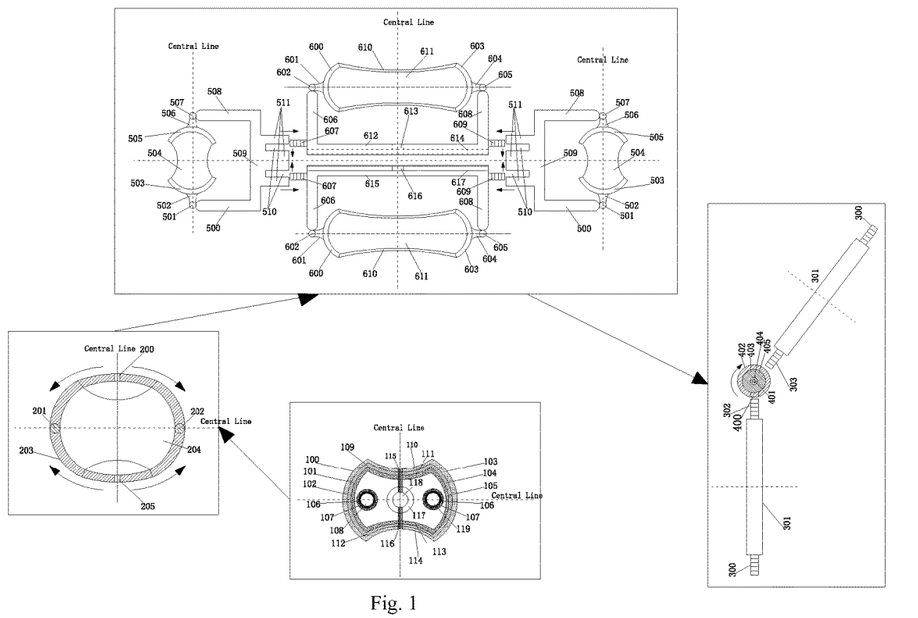
FIG. 1 is a structural drawing of the present invention.
Figure 2:
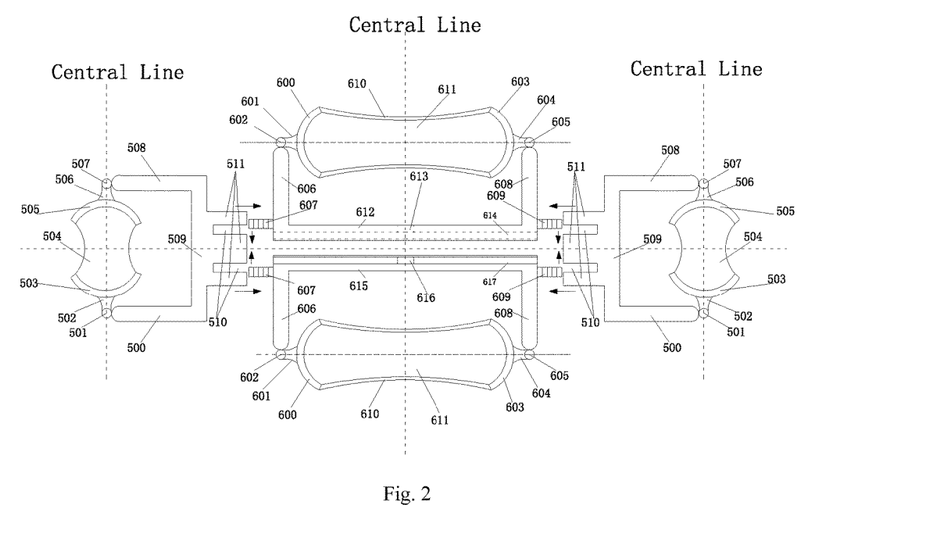
FIG. 2 is a structural drawing of a seepage monitoring device of the present invention.

The first seepage monitoring unit includes a first fiber-carrying recess 611 for fixing a monitoring fiber unit, the outside of the first fiber-carrying recess 611 is provided with a fiber-carrying protection layer 610, the two ends of the first fiber-carrying recess 611 are respectively provided with a left fiber-carrying end 600 and a right fiber-carrying end 603, the left fiber-carrying end 600 is connected to a left connecting ball 602 through a left connecting handle 601, the right fiber-carrying end 603 is connected to a right connecting ball 605 through a right connecting handle 604, the left connecting ball 602 and the right connecting ball 605 are hinged at the two ends of a cross beam support, and the cross beam support is extended with a left pin shaft 607 and a right pin shaft 609 towards the left and right sides.

The second seepage monitoring unit includes a second fiber-carrying recess 504 for fixing the monitoring fiber unit, the two ends of the second fiber-carrying recess 504 are respectively provided with an upper fiber-carrying arc end 505 and a lower fiber-carrying arc end 503, the upper fiber-carrying arc end 505 is connected to an upper connecting shaft ball 507 through an upper arc connecting handle 506, the lower fiber-carrying arc end 503 is connected to a lower connecting shaft ball 501 through a lower arc connecting handle 502, the two ends of the gable end beam 509 are extended with an upper cross breaking beam 508 and a lower cross breaking beam 500, the upper connecting shaft ball 507 and the lower connecting shaft ball 501 are hinged on the upper cross breaking beam 508 and the lower cross breaking beam 500, the gable end beam 509 is extended with a gable convex column 511, and the inside of the gable convex column 511 is provided with conical holes 510 matched with the left pin shaft 607 and the right pin shaft 609.

Figure 7:
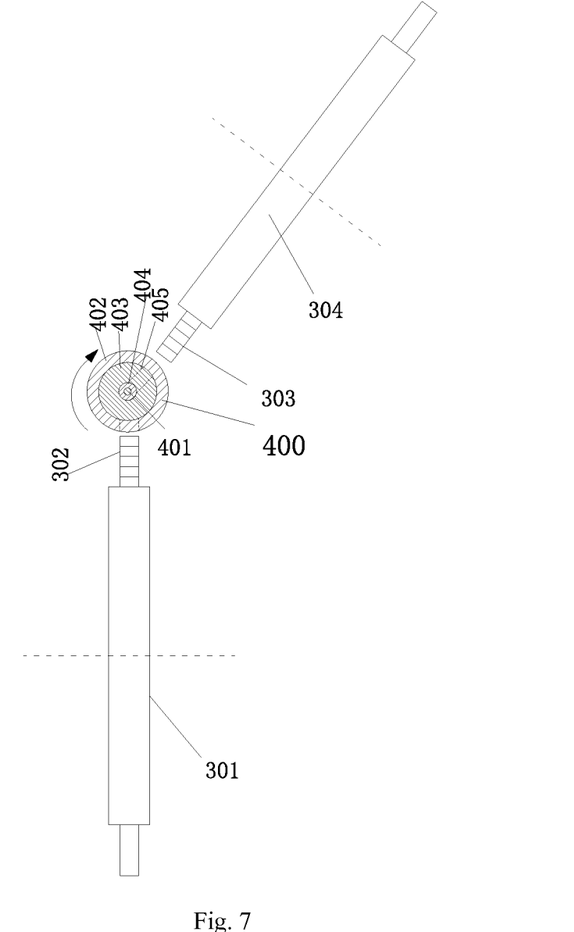
FIG. 7 is a plan of a free turntable in FIG. 1.
Figure 8:
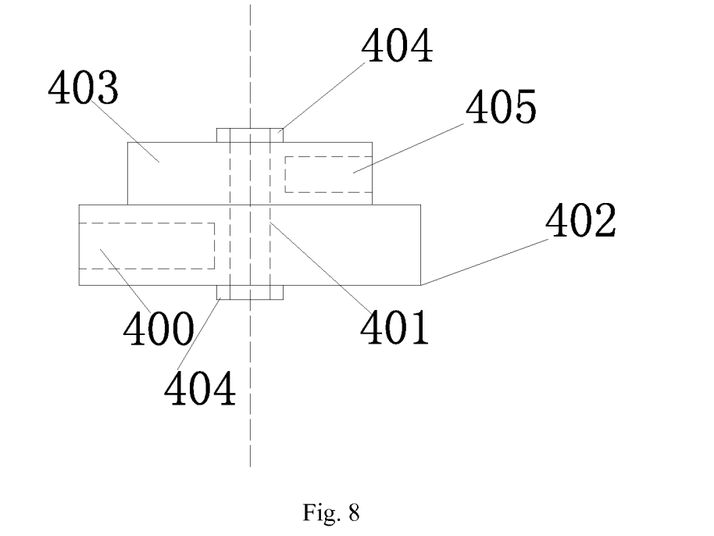
FIG. 8 is a detailed structure drawing of FIG. 7.

The rotary support includes a first supporting framework column 301 and a second supporting framework column 304, one end of the first supporting framework column 301 is connected to the cross beam support and the other end is connected to a bottom circular turntable 402, and an upper circular turntable 403 is installed on the bottom circular turntable 402; one end of the second supporting framework column 304 is connected to the cross beam support of another seepage monitoring device and the other end is inserted into the upper circular turntable 403; a penetrating vertical beam 401 is installed on the center of the bottom circular turntable 402 and the upper circular turntable 403, the first supporting framework column 301 and the second supporting framework 304 can respectively rotate around the penetrating vertical beam 401, and the upper and lower ends of the penetrating vertical beam 401 are provided with turntable circular grooves 404 to block the penetrating vertical beam 401.

Figure 5:
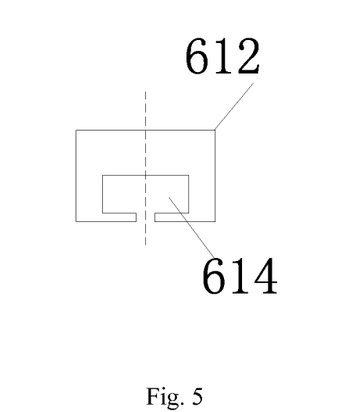
FIG. 5 is a sectional drawing of an upper horizontal cross beam in FIG. 1.
Figure 6:
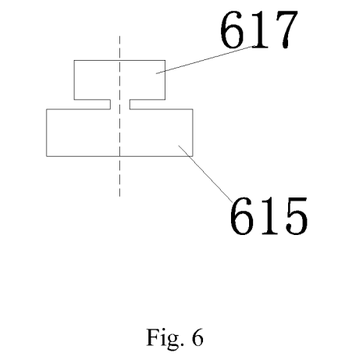
FIG. 6 is a sectional drawing of a lower horizontal cross beam in FIG. 1.

In the present invention, the cross beam support includes an upper horizontal cross beam 612 and a lower horizontal cross beam 615 connected to the upper horizontal cross beam 612, the two ends of the upper horizontal cross beam 612 and the lower horizontal cross beam 615 are respectively extended with a left framework beam 606 and a right framework beam 608, the left framework beams 606 and the right framework beams 608 of the upper horizontal cross beam 612 and the lower horizontal cross beam 615 are respectively hinged with the left connecting ball 602 and the right connecting ball 605, the middle parts of the upper horizontal cross beam 612 and the lower horizontal cross beam 615 are respectively provided with an upper end groove 613 and a lower end groove 616, the upper end groove 613 is connected to the first supporting framework column 301, and the lower end groove 616 is connected to the first supporting framework column 301 of another rotary support.

In the present invention, the upper horizontal cross beam 612 is provided with a T-shaped cross beam clamping groove 614, and the lower horizontal cross beam 615 is provided with a cross beam lug boss moving along the T-shaped cross beam clamping groove 614.

Figure 3:
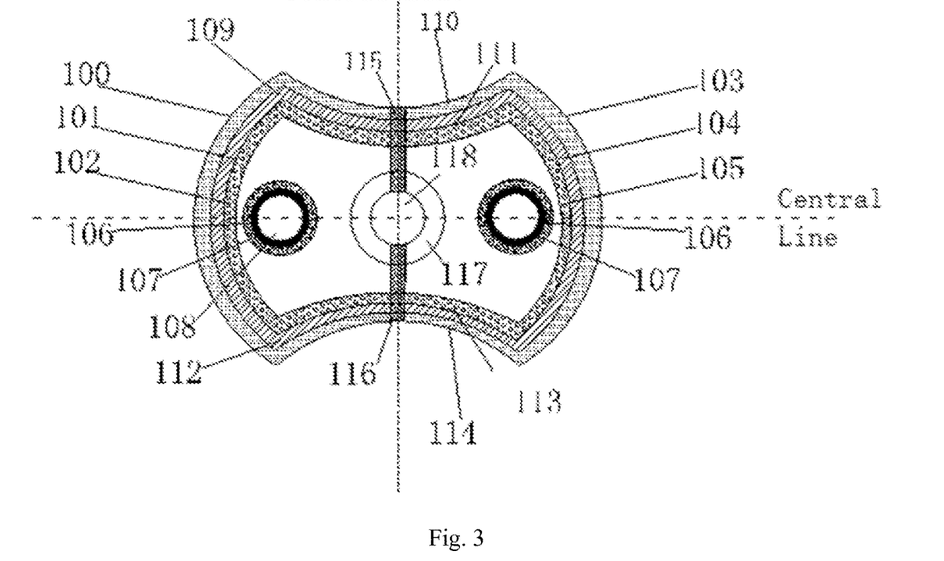
FIG. 3 is a structural drawing of the seepage monitoring fiber unit in FIG. 1.

In the present invention, the monitoring fiber unit includes one piece of seepage monitoring fiber 118 and two pieces of calibrated fibers 108, the two pieces of calibrated fibers 108 are located at the two sides of the seepage monitoring fiber 118, the seepage monitoring fiber 118 and the two pieces of calibrated fibers 108 are fixed through filling packing in the recess, the outside of the seepage monitoring fiber 118 is sheathed with a hard steel ring 117, the calibrated fibers 108 are sheathed with an adiabatic interlayer 106 and a hard protection layer 107 from inside to outside in sequence, the outside of the seepage monitoring fiber 118 is provided with an upper concave edge inner layer 111, a left concave edge inner layer 102, a lower concave edge inner layer 113 and a right concave edge inner layer 105 which are connected in sequence, the outside of the upper concave edge inner layer 111 is provided with an upper concave edge middle layer 109 and an upper concave edge outer layer 110 in sequence, the outside of the left concave edge inner layer 102 is provided with a left concave edge middle layer 101 and a left concave edge outer layer 100 in sequence, the outside of the lower concave edge inner layer 113 is provided with a lower concave edge middle layer 112 and a lower concave edge outer layer 114 in sequence, and the outside of the right concave edge inner layer 105 is provided with a right concave edge middle layer and a right concave edge outer layer 103 in sequence. The bottom end of the concave structure will collect probable seepage water body in perimeter regions very easily, amplify the effect of small seepages, and be matched with the dialysis bar at the bottom end, thus greatly improving the identifying capacity on weak seepage or primary seepage. The arc section structure will enlarge the staying time and contact area of the seepage water body in the seepage region on the seepage monitoring fiber 118 to the maximum, and have higher precision assurance effect on positioning the seepage position in the region for monitoring. Moreover, the upper concave edge outer layer 110 has anti-seepage and anti-corrosion performances, and the upper concave edge middle layer 109 and the upper concave edge inner layer 111 having similar section shapes are designed to be closely connected to the upper concave edge outer layer. The three-layer concave design structure improves the intensity and toughness of the fiber specially used for seepage monitoring, and can play the roles of protecting internal structures and prolonging the service life and the like.

Wherein, the hard protection layer 107 is disposed outside the adiabatic interlayer 106, the inside of the adiabatic interlayer 106 is contacted with the calibrated fiber 108; when the seepage water body acts on the region for monitoring, the calibrated fiber under the effect of the adiabatic interlayer 106 is under a state that has no heat contact with the outside, and will be used as reference calibrated fiber, and second correction of the result of the reference calibrated fiber 108 may be conducted by another calibrated fiber which is disposed symmetrically, so that the objective accuracy of the reference standard can be ensured to the maximum. The left concave edge outer layer 100 and the right concave edge outer layer 103 are convex edge structures with opposite concave edge outer layers. This opposite corresponding design greatly increases the sectional area of the special fibers for seepage, and improves the contact and connection tightness of the monitoring device and the structure for monitoring, and enhances the cooperativity between the monitoring device and the structure for monitoring. Moreover, one of the effects for disposing it into a structure respectively having three layers in left and right is to increase the thickness of the interlayer at the position of the calibrated fiber 108, and the strength and the toughness of the materials are constantly increased from inside to outside; therefore, not only the flexible transition connection between the interior of the interlayer and the calibrated fiber 108 is improved, but also the effect of resisting a larger external seepage water pressure is increased; the left concave edge outer layer 100 and the right concave edge outer layer 103 have erosion resistance performance, so that the long-term coexistence between the left concave edge outer layer and the right concave edge outer layer, and the seepage water body is improved; in a complicated environment that may be possibly doped by corrosive ions, it has better seepage monitoring efficacy.

In the present invention, the two sides of the seepage monitoring fiber 118 are respectively connected to an upper dialysis bar 115 and a lower dialysis bar 116, the upper dialysis bar 115 traverses the hard steel ring 117, the upper concave edge inner layer 111, the upper concave edge middle layer 109 and the upper concave edge outer layer 110 in sequence so as to be contacted with an outside seepage water flow, and the lower dialysis bar 116 traverses the hard steel ring 117, the lower concave edge inner layer 113, the lower concave edge middle layer 112 and the lower concave edge outer layer 114 in sequence so as to be contacted with the outside seepage water flow.

Figure 4:
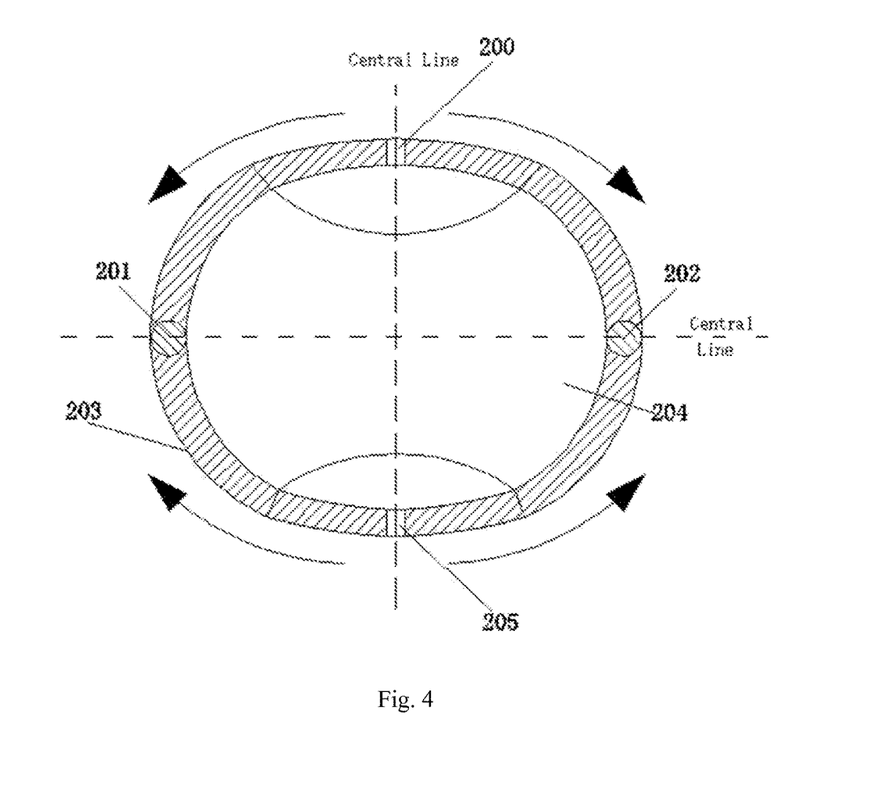
FIG. 4 is a structural drawing of an excircle retaining wall of the present invention.

In the present invention, an excircle retaining wall 203 is installed outside the monitoring fiber unit, the excircle retaining wall 203 includes an upper-left excircle retaining wall, a lower-left excircle retaining wall, an upper-right excircle retaining wall and a lower-right excircle retaining wall, the upper-left excircle retaining wall, the lower-left excircle retaining wall, the upper-right excircle retaining wall and the lower-right excircle retaining wall form a concave-convex type fiber-carrying cavity 204, the monitoring fiber unit is located in the concave-convex type fiber-carrying cavity 204, the upper-left excircle retaining wall and the upper-right excircle retaining wall are tightly locked through an upper fiber-carrying buckle 200, the lower-left excircle retaining wall and the lower-right excircle retaining wall are tightly locked through a lower fiber-carrying buckle 205, the upper-left excircle retaining wall and the lower-left excircle retaining wall respectively rotate around a left circular swivel 201, and the upper-right excircle retaining wall and the lower-right excircle retaining wall respectively rotate around a right circular swivel 202.

The approximate circular cross section of the excircle retaining wall 203 makes secondary supplement on the concave section of the concave-convex designed monitoring fiber unit, and composes the fiber special for seepage disposed inside into a structure the outer section of which is approximate to a circle, thus making up the possible defects existing in production, transportation and disposing brought by its unique structure. The excircle retaining wall 203 can be opened around the left circular swivel 201 and the right circular swivel 202. The concave-convex type fiber-carrying cavity 204 in the excircle retaining wall 203 can precisely embed the fiber special for seepage of the present invention into the concave-convex type fiber-carrying cavity 204. The upper fiber-carrying buckle 200 and the lower fiber-carrying buckle 205 on the top and bottom of the excircle retaining wall 203 firmly close the excircle retaining wall 203, and prevent the excircle retaining wall 203 from loosing or disturbance of other factors such as artificial disturbance from the outside. Moreover, a cavity is designed between the excircle retaining 203 and the concave-convex type fiber-carrying cavity 204, which reserves space for probable use and operation.

In the present invention, the first supporting framework column 301 is connected to the upper end groove 613 in the upper horizontal cross beam 612 or the lower end groove 616 in the lower horizontal cross beam, and the other end of the first supporting framework column 301 is connected to the bottom circular turntable 402; after a lower rotating screw end 302 is connected to the bottom turntable screw groove 400, the seepage monitoring device at one end can conduct 360-degree dead space-free free rotation with the seepage monitoring device at the other end around the penetrating vertical beam 401; one end of an upper rotating screw end 303 is connected to the second supporting framework column 304 at the corresponding side thereof, the other end of the upper rotating screw end 303 is connected to the upper turntable screw groove 405, and the upper rotating screw end can drive the seepage monitoring device connected through a connecting screw end at the corresponding side to conduct 360-degree dead space-free free rotation at the other side around the penetrating vertical beam 401; the upper circular turntable 403 and the bottom circular turntable 402 which are dislocated up and down can realize the noninterference running of adjacent devices, and conduct any angle and any slope disposing of different regions for monitoring; and the disposing structure of the upper and lower turntable circular grooves 404 firmly mounts the upper circular turntable 403 and the bottom circular turntable 402 at the position of the penetrating vertical beam 401.

Figure 9:
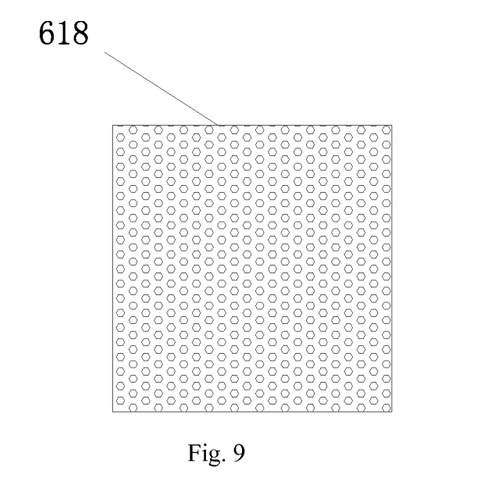
FIG. 9 is a detailed structural drawing of a seepage wire screen in FIG. 1.

In the present invention, a seepage wire screen 618 is installed on the inner surface of the second fiber-carrying recess 504, and the surface of the seepage wire screen 618 is alveolar.

In the present invention, both the left pin shaft 607 and the right pin shaft 609 are provided with a circular arc recess, the upper surface of the gable convex column 511 is provided with a pin hole, a pin is inserted into the pin hole, and the left pin shaft 607 and the right pin shaft 609 are fixed by inserting the pin into the circular arc recess.

A monitoring method for a heat source-free fiber positioning and orienting system for seepage of submerged or partially submerged structuresincludes the following steps of:

first step: determining the number of seepage monitoring devices according to the disposing requirements of a region for seepage monitoring, wherein six seepage monitoring devices are preliminarily determined based on the region for seepage monitoring, preparing 72 pieces of basic single mode bare fibers, and manufacturing the bare fibers into 24 monitoring fiber units with fixed length based on the basic structures of the seepage monitoring fiber units;

second step: opening an upper-left excircle retaining wall, a lower-left excircle retaining wall, an upper-right excircle retaining wall and a lower-right excircle retaining wall around a left circular swivel 201 and a right circular swivel 202, disposing the monitoring fiber units in a concave-convex type fiber-carrying cavity 204, then rotating the left circular swivel 201 and the right circular swivel 202 to fold the upper-left excircle retaining wall, the lower-left excircle retaining wall, the upper-right excircle retaining wall and the lower-right excircle retaining wall, using an upper fiber-carrying buckle 200 and a lower fiber-carrying buckle 205 to buckle the upper-left excircle retaining wall, the lower-left excircle retaining wall, the upper-right excircle retaining wall and the lower-right excircle retaining wall distributed at the two ends, then winding the monitoring fiber units on a fiber roller wheel, and transporting the 24 monitoring fiber units to a position for seepage monitoring;

third step: adjusting a cross beam clamping groove 614 on an upper horizontal cross beam 612, straightly sliding a cross beam convex groove 617 in a lower horizontal cross beam 615 along the cross beam clamping groove 614, and finally screwing and disposing the upper horizontal cross beam 612 and the lower horizontal cross beam 615 together in parallel, then unscrewing left pin shafts 607 symmetrically distributed upper and lower in the left side, inserting the left pin shafts 607 into conical holes in a gable convex column 511 at the left side, then inserting pins into pin holes to fix the left pin shafts, and screwing the left pin shaft in the conical hole 510 in the gable convex column 511 at the left side, and similarly, unscrewing right pin shafts 609 symmetrically distributed upper and lower in the right side, inserting the right pin shafts into conical holes in a gable convex column 511 at the right side, then inserting pins into pin holes to fix the right pin shafts 609;

fourth step: after transporting the monitoring fiber units to a region for monitoring, unscrewing the upper fiber-carrying buckle 200 and the lower fiber-carrying buckle 205, opening the upper-left excircle retaining wall, the lower-left excircle retaining wall, the upper-right excircle retaining wall and the lower-right excircle retaining wall to take the monitoring fiber units out from the concave-convex type fiber-carrying cavity 204, disposing one monitoring fiber unit with fixed length in a second fiber-carrying recess 504 the two ends of which are symmetrically distributed and the inner wall of which is provided with a seepage wire screen 618, and disposing another monitoring fiber unit with fixed length into a first fiber-carrying recess 611 the inner wall of which is provided with a seepage wire screen 618; hinging the second fiber-carrying recess 504 provided with a lower arc connecting handle 502, a lower fiber-carrying arc end 503, an upper arc connecting handle 506 and an upper fiber-carrying arc end 505 to the two ends of a gable end beam 509 through a lower connecting shaft ball 501 and an upper connecting shaft ball 507 in the left side, and similarly, hinging the second fiber-carrying recess 504 provided with the lower arc connecting handle 502, the lower fiber-carrying arc end 503, the upper arc connecting handle 506 and the upper fiber-carrying arc end 505 to the two ends of the gable end beam 509 through a lower connecting shaft ball 501 and an upper connecting shaft ball 507 in the right side;

fifth step: hinging a first fiber-carrying recess 611 connected with a left fiber-carrying end 600, a left connecting handle 601, as a right fiber-carrying end 603 and a right connecting handle 604 to a left framework beam 606 and a right framework beam 608 through a left connecting ball 602 and a right connecting ball 605 at the upper end, and similarly, hinging the first fiber-carrying recess 611 connected with the left fiber-carrying end 600, the left connecting handle 601, the right fiber-carrying end 603 and the right connecting handle 604 to the left framework beam 606 and the right framework beam 608 through a left connecting ball 602 and a right connecting ball 605 at the lower end, thus finishing disposing the seepage monitoring devices at the starting end hereto;

sixth step: inserting one end of a first supporting framework column 301 into an upper end groove 613 in the upper horizontal cross beam 612, disposing the other end of the first supporting framework column 301 into a bottom turntable screw groove 400, inserting one end of a second supporting framework column 304 into an upper turntable screw groove 405, pressing a penetrating vertical beam 401 and disposing turntable circular grooves 404 at the upper and lower ends of the penetrating vertical beam 401 so as to completely block the penetrating vertical beam 401, connecting the other end of the second supporting framework column 304 to a cross beam clamping groove 614 in an upper horizontal cross beam 612 of another seepage monitoring device, rotating the first supporting framework column 301 and the second supporting framework column 304 up and down around the penetrating vertical beam so as to adjust the disposing formats of the first and second supporting framework columns, thus being effectively matched with a structure for monitoring in a region for seepage monitoring, disposing lower horizontal cross beams of two seepage monitoring devices according to the same step above so as to connect different seepage monitoring devices in series through another new rotary support, adjusting the rotating direction of the supporting framework column 301 so as to finish disposing the seepage monitoring devices at the tail end, and connecting the calibrated fibers and the seepage monitoring fibers in all the seepage monitoring devices with an information collecting device;

seventh step: connecting the six seepage monitoring devices at different positions in sequence through five rotary supports according to the same method, using a DVP-730H fiber fusion splicer to fuse the fibers in each seepage monitoring devices, and then using a plastic outer bushing for protection;

eighth step: opening the fiber information collecting device, collecting the information of the calibrated fibers 108 firstly, using a fiber demodulator to demodulate the temperature values of each calibrated fiber (see Table 1 for the temperature values of each calibrated fiber at this moment), removing the fibers T15, T16, Tr7 and Tr8 having a larger difference to the mean value, and reserving several pieces of calibrated fibers Th1, Th2, Tb3 and Tb4 with smaller temperature changes, and taking the calibrated fibers subjected to mutual correction as the final calibrated fiber, wherein the value of the final calibrated fiber is 10.59° C.; and

TABLE 1

Temperature value of each calibrated fiber

| Position | Tag | Demodulating Temperature (° C.) | Mean value (° C.) | Difference to the mean value (° C.) | Absolution value of the difference to the mean value (° C.) | Several larger absolution value of the difference to the mean value (° C.) | Mean values after removing several larger absolution value of the difference to the mean value (° C.) |
|---|---|---|---|---|---|---|---|
| Calibrated fiber at the left side of first seepage unit in the front end | Th1 | 10.70 | 10.56 | 0.11 | 0.11 | / | 10.59 |
| Calibrated fiber at the right side of first seepage unit in the front end | Th2 | 10.56 | | 0.01 | 0.01 | / | |
| Calibrated fiber at the left side of first seepage unit in the rear end | Tb3 | 10.73 | | 0.18 | 8 | / | |
| Calibrated fiber at the right side of first seepage unit in the rear end | Tb4 | 10.40 | | −0.15 | 0.15 | / | |
| Calibrated fiber at the left side of second seepage unit in the left end | Tl5 | 10.89 | | 0.34 | 0.34 | 4 | |
| Calibrated fiber at the right side of second seepage unit in the left end | Tl6 | 10.16 | | −0.40 | 0.40 | 2 | |
| Calibrated fiber at the left side of second seepage unit in the right end | Tr7 | 10.90 | | 0.34 | 0.34 | 3 | |
| Calibrated fiber at the right side of second seepage unit in the right end | Tr8 | 10.13 | | −0.42 | 0.42 | 1 | | ninth step: after a seepage water body passes through the region, directly transferring the heat of the seepage water body to the position of the seepage monitoring fibers 118 through an upper dialysis bar 115 and a lower dialysis bar 116, recording the change situations of the seepage monitoring fibers in real time, and using a fiber information demodulator to demodulate the monitoring fiber units on different directions to obtain the value of the seepage monitoring fiber 118 between the fourth seepage monitoring device and the fifth seepage monitoring device on different directions at the moment, wherein the details are as shown in FIG. 2.

TABLE 2

Demodulating Information value of Seepage Monitoring Fiber

| Position | Tag | Demodulating temperature (° C.) | Absolute value of the difference between the demodulating temperature and the temperature of the calibrated fiber (° C.) |
|---|---|---|---|
| Seepage monitoring fiber of first seepage unit in the front end | Ts9 | 10.00 | 0.59 |
| Seepage monitoring fiber of first seepage unit in the rear end | Ts10 | 10.90 | 0.31 |
| Seepage monitoring fiber of second seepage unit in the left end | Ts11 | 7.20 | 3.39 |
| Seepage monitoring fiber of second seepage unit in the right end | Ts12 | 10.10 | 0.49 |

At this moment and in a distance range between the fourth seepage monitoring device and the fifth seepage monitoring device, the detailed comparison result with that of the calibrated fibers in the eighth step is as seen in the last list of Table 2; at the moment and in the monitoring distance range, the situation of apparently larger value occurs in the seepage monitoring fibers of the second seepage unit in the left end, representing that a seepage problem may possibly exist, and the seepage position is in the left side direction; further, an absolute curve of the difference of the demodulating temperature of the seepage monitoring fibers and the temperature of the calibrated fibers at each moment in the monitoring distance range is drawn, thus further observing the changes of the entire time travel; if the entire time travel curve is very stable and is basically round zero, then it is determined that there is no seepage; if the time travel change curve fluctuates largely, then it represents that seepage exists in the position, and the seepage changes consistently, which needs attention; by monitoring the seepage situations at different sides, seepage from different direction is determined; the seepage situation from the left end is relatively severe and needs reinforced monitoring subsequently on the basis of the time travel change curve of the monitoring and analyzing in this time; the seepage situations at different positions are analyzed through monitoring the time travel curve changes of the seepage monitoring fiber within a scope among different seepage monitoring devices; upon analysis, the time travel change curves of other parts and directions are basically around zero, so that it can be basically determined that no seepage exists; and finally, seepage positioning and orientating monitoring of the region for monitoring in the submerged or partially submerged structures is realized.

The disclosed above is merely preferred implementation manners of the present invention. It should be noted that those having ordinary skill in the art may figure out a plurality of improvements and polishing without departing from the principle of the present invention which shall all be deemed as the protection scope of the present invention.

The invention claimed is:

1. A heat source-free fiber positioning and orienting system for seepage of submerged or partially submerged structures, comprising a plurality of seepage monitoring devices connected through rotary supports, wherein the seepage monitoring devices comprise first seepage monitoring units symmetrically distributed on the front and back and second seepage monitoring units symmetrically distributed on left and right;

the first seepage monitoring unit comprises a first fiber-carrying recess for fixing a monitoring fiber unit, the outside of the first fiber-carrying recess is provided with a fiber-carrying protection layer, ends of the first fiber-carrying recess are respectively provided with a left fiber-carrying end and a right fiber-carrying end, the left fiber-carrying end is connected to a left connecting ball through a left connecting handle, the right fiber-carrying end is connected to a right connecting ball through a right connecting handle, the left connecting ball and the right connecting ball are hinged at the two ends of a cross beam support, the cross beam support is extended with a left pin shaft and a right pin shaft towards the left and right sides, and the monitoring fiber unit is connected to an information collecting device;

the second seepage monitoring unit comprises a second fiber-carrying recess for fixing the monitoring fiber unit, ends of the second fiber-carrying recess are respectively provided with an upper fiber-carrying arc end and a lower fiber-carrying arc end, the upper fiber-carrying arc end is connected to an upper connecting shaft ball through an upper arc connecting handle, the lower fiber-carrying arc end is connected to a lower connecting shaft ball through a lower arc connecting handle, the upper connecting shaft ball and the lower connecting shaft ball are hinged at the two ends of a gable end beam, the gable end beam is extended with a gable convex column, and the inside of the gable convex column is provided with conical holes matched with the left pin shaft and the right pin shaft; and the rotary support comprises a first supporting framework column and a second supporting framework column, one end of the first supporting framework column is connected to the cross beam support and the other end is connected to a bottom circular turntable, and an upper circular turntable is installed on the bottom circular turntable; one end of the second supporting framework column is connected to the cross beam support of another seepage monitoring device and the other end is inserted into the upper circular turntable; a penetrating vertical beam is installed on respective centers of the bottom circular turntable and the upper circular turntable, the first supporting framework column and the second supporting framework can respectively rotate around the penetrating vertical beam, and upper and lower ends of the penetrating vertical beam are provided with turntable circular grooves to block the penetrating vertical beam.

2. The heat source-free fiber positioning and orienting system for seepage of submerged or partially submerged structures according to claim 1, wherein the cross beam support comprises an upper horizontal cross beam and a lower horizontal cross beam connected to the upper horizontal cross beam, ends of the upper horizontal cross beam and the lower horizontal cross beam are respectively extended with a left framework beam and a right framework beam, the left framework beams and the right framework beams of the upper horizontal cross beam and the lower horizontal cross beam are respectively hinged with the left connecting ball and the right connecting ball, middle parts of the upper horizontal cross beam and the lower horizontal cross beam are respectively provided with an upper end groove and a lower end groove, the upper end groove is connected to the first supporting framework column, and the lower end groove is connected to the first supporting framework column of another rotary support.

3. The heat source-free fiber positioning and orienting system for seepage of submerged or partially submerged structures according to claim 2, wherein the upper horizontal cross beam is provided with a T-shaped cross beam clamping groove, and the lower horizontal cross beam is provided with a cross beam lug boss moving along the T-shaped cross beam clamping groove.

4. The heat source-free fiber positioning and orienting system for seepage of submerged or partially submerged structures according to claim 1, wherein the monitoring fiber unit comprises one piece of seepage monitoring fiber and two pieces of calibrated fibers, the two pieces of calibrated fibers are located at sides of the seepage monitoring fiber, the outside of the seepage monitoring fiber is sheathed with a hard steel ring, the calibrated fibers are sheathed with an adiabatic interlayer and a hard protection layer from inside to outside in sequence, the outside of the seepage monitoring fiber is provided with an upper concave edge inner layer, a left concave edge inner layer, a lower concave edge inner layer and a right concave edge inner layer which are connected in sequence, the outside of the upper concave edge inner layer is provided with an upper concave edge middle layer and an upper concave edge outer layer in sequence, the outside of the left concave edge inner layer is provided with a left concave edge middle layer and a left concave edge outer layer in sequence, the outside of the lower concave edge inner layer is provided with a lower concave edge middle layer and a lower concave edge outer layer in sequence, and the outside of the right concave edge inner layer is provided with a right concave edge middle layer and a right concave edge outer layer in sequence.

5. The heat source-free fiber positioning and orienting system for seepage of submerged or partially submerged structures according to claim 4, wherein the two sides of the seepage monitoring fiber are respectively connected to an upper dialysis bar and a lower dialysis bar, the upper dialysis bar traverses the hard steel ring, the upper concave edge inner layer, the upper concave edge middle layer and the upper concave edge outer layer in sequence so as to be contacted with an outside seepage water flow, and the lower dialysis bar traverses the hard steel ring, the lower concave edge inner layer, the lower concave edge middle layer and the lower concave edge outer layer in sequence so as to be contacted with the outside seepage water flow.

6. The heat source-free fiber positioning and orienting system for seepage of submerged or partially submerged structures according to claim 5, wherein an excircle retaining wall is installed outside the monitoring fiber unit, the excircle retaining wall comprises an upper-left excircle retaining wall, a lower-left excircle retaining wall, an upper-right excircle retaining wall and a lower-right excircle retaining wall, the upper-left excircle retaining wall, the lower-left excircle retaining wall, the upper-right excircle retaining wall and the lower-right excircle retaining wall form a concave-convex type fiber-carrying cavity, the monitoring fiber unit is located in the concave-convex type fiber-carrying cavity, the upper-left excircle retaining wall and the upper-right excircle retaining wall are tightly locked through an upper fiber-carrying buckle, the lower-left excircle retaining wall and the lower-right excircle retaining wall are tightly locked through a lower fiber-carrying buckle, the upper-left excircle retaining wall and the lower-left excircle retaining wall respectively rotate around a left circular swivel, and the upper-right excircle retaining wall and the lower-right excircle retaining wall respectively rotate around a right circular swivel.

7. The heat source-free fiber positioning and orienting system for seepage of submerged or partially submerged structures according to claim 1, wherein a seepage wire screen is installed on the inner surface of the second fiber-carrying recess, and the surface of the seepage wire screen is alveolar.

8. The heat source-free fiber positioning and orienting system for seepage of submerged or partially submerged structures according to claim 1, wherein both the left pin shaft and the right pin shaft are provided with a circular arc recess, the upper surface of the gable convex column is provided with a pin hole, a pin is inserted into the pin hole, and the left pin shaft and the right pin shaft are fixed by inserting the pin into the circular arc recess.

9. A monitoring method for seepage of submerged or partially submerged structures by heat source-free fiber positioning and orienting system, comprising:
    first step: preparing a plurality of pieces of basic single mode bare fibers, and manufacturing the bare fibers into a plurality of pieces of monitoring fiber units with fixed length based on the structures of a first seepage monitoring unit and a second seepage monitoring unit;
    second step: opening an upper-left excircle retaining wall, a lower-left excircle retaining wall, an upper-right excircle retaining wall and a lower-right excircle retaining wall around a left circular swivel and a right circular swivel, disposing the monitoring fiber units in a concave-convex type fiber-carrying cavity, then rotating the left circular swivel and the right circular swivel to fold the upper-left excircle retaining wall, the lower-left excircle retaining wall, the upper-right excircle retaining wall and the lower-right excircle retaining wall, using an upper fiber-carrying buckle and a lower fiber-carrying buckle to buckle the upper-left excircle retaining wall, the lower-left excircle retaining wall, the upper-right excircle retaining wall and the lower-right excircle retaining wall distributed at ends, then winding the monitoring fiber units on a monitoring fiber unit roller wheel, and transporting the monitoring fiber units to a position for seepage monitoring;
    third step: adjusting a cross beam clamping groove on an upper horizontal cross beam, straightly sliding a cross beam convex groove in a lower horizontal cross beam along the cross beam clamping groove, and finally screwing and disposing the upper horizontal cross beam and the lower horizontal cross beam together in parallel, then unscrewing left pin shafts symmetrically distributed upper and lower in the left side, inserting the left pin shafts into conical holes in a gable convex column at the left side, then inserting pins into pin holes to fix the left pin shafts, and similarly, unscrewing right pin shafts symmetrically distributed upper and lower in the right side, inserting the right pin shafts into conical holes in a gable convex column at the right side, then inserting pins into pin holes to fix the right pin shafts;

fourth step: after transporting the monitoring fiber units to the region for monitoring, unscrewing the upper fiber-carrying buckle and the lower fiber-carrying buckle, opening the upper-left excircle retaining wall, the lower-left excircle retaining wall, the upper-right excircle retaining wall and the lower-right excircle retaining wall to take the monitoring fiber units out from the concave-convex type fiber-carrying cavity, disposing one monitoring fiber unit with fixed length in a second fiber-carrying recess the two ends of which are symmetrically distributed and the inner wall of which is provided with a seepage wire screen, and disposing another monitoring fiber unit with fixed length into a first fiber-carrying recess the inner wall of which is provided with a seepage wire screen; hinging the second fiber-carrying recess provided with a lower arc connecting handle, a lower fiber-carrying arc end, an upper arc connecting handle and an upper fiber-carrying arc end to the two ends of a gable end beam through a lower connecting shaft ball and an upper connecting shaft ball in the left side, and similarly, hinging the second fiber-carrying recess provided with the lower arc connecting handle, the lower fiber-carrying arc end, the upper arc connecting handle and the upper fiber-carrying arc end to the two ends of the gable end beam through a lower connecting shaft ball and an upper connecting shaft ball in the right side;

fifth step: hinging a first fiber-carrying recess connected with a left fiber-carrying end, a left connecting handle as well as a right fiber-carrying end and a right connecting handle to a left framework beam and a right framework beam through a left connecting ball and a right connecting ball at the upper end, and similarly, hinging the first fiber-carrying recess connected with the left fiber-carrying end, the left connecting handle, the right fiber-carrying end and the right connecting handle to the left framework beam and the right framework beam through a left connecting ball and a right connecting ball at the lower end, thus finishing disposing the seepage monitoring devices at the starting end hereto;

sixth step: inserting one end of a first supporting framework column into an upper end groove in the upper horizontal cross beam, disposing the other end of the first supporting framework column into a bottom turntable screw groove, inserting one end of a second supporting framework column into an upper turntable screw groove, pressing a penetrating vertical beam and disposing turntable circular grooves at the upper and lower ends of the penetrating vertical beam so as to completely block the penetrating vertical beam, connecting the other end of the second supporting framework column to a cross beam clamping groove in an upper horizontal cross beam of another seepage monitoring device, rotating the first supporting framework column and the second supporting framework column up and down around the penetrating vertical beam so as to adjust the disposing formats of the first and second supporting framework columns, thus being effectively matched with a structure for monitoring in a region for seepage monitoring, disposing lower horizontal cross beams of two seepage monitoring devices according to the same step above so as to connect different seepage monitoring devices in series through another new rotary support, adjusting the rotating direction of the supporting framework column so as to finish disposing the seepage monitoring devices at the tail end, and connecting the calibrated fibers and the seepage monitoring fibers in all the seepage monitoring devices with an information collecting device;

seventh step: opening the information collecting device, collecting the information of the calibrated fibers firstly, removing the fibers therein having a larger difference to a mean value, and reserving several pieces of calibrated fibers with minimum temperature changes, and taking the calibrated fibers subjected to mutual correction as final calibrated fibers; and eighth step: after a seepage water body passes through the region, directly transferring the heat of the seepage water body to the position of the seepage monitoring fibers through an upper dialysis bar and a lower dialysis bar, recording change situations of the seepage monitoring fibers in real time, comparing the seepage monitoring fibers with the calibrated fibers in the seventh step for analysis, and identifying the seepage condition of the position; when the seepage water body of the submerged or partially submerged structures flows through the seepage monitoring device, collecting the water body passed by through the first fiber-carrying recess and the second fiber-carrying recess in a first monitoring fiber unit and a second monitoring fiber unit, recording data collected by the information collecting device in real time, differentiating the value of the data value with the value of the calibrated fibers, drawing a differentiating result into a time travel curve, and determining that the seepage water body presents in the position if the time travel curve changes largely, thus realizing positioning; through the same method above, analyzing the time travel curves of the monitoring fiber unit disposed on different directions in the seepage monitoring devices, and determining that the seepage water body presents in a certain direction if the time travel curve of the monitoring fibers on the direction fluctuates largely, thus realizing positioning; and thereby realizing seepage positioning and orientating monitoring of the submerged or partially-submerged structures.

\* \* \* \* \*